(12) United States Patent
Archibald et al.

(10) Patent No.: US 6,318,564 B1
(45) Date of Patent: Nov. 20, 2001

(54) STRAINER

(75) Inventors: Thomas E. Archibald; Yoram Ringer, both of Providence, RI (US)

(73) Assignee: Grinnell Corporation, Cranston, RI (US)

( * ) Notice: Subject to any disclaimer, the term of this patent is extended or adjusted under 35 U.S.C. 154(b) by 0 days.

(21) Appl. No.: 09/498,150

(22) Filed: Feb. 4, 2000

(51) Int. Cl.$^7$ ..................................................... B01D 35/04
(52) U.S. Cl. ...................... 210/448; 210/459; 210/497.3; 169/13
(58) Field of Search .................... 210/162, 448, 210/452, 459, 497.01, 497.3, 435; 222/DIG. 23; 169/5, 13

(56) References Cited

U.S. PATENT DOCUMENTS

| | | | |
|---|---|---|---|
| 711,535 | * | 10/1902 | Scholl . |
| 1,273,656 | * | 7/1918 | Paget ................................ 210/497.01 |
| 1,704,634 | * | 3/1929 | Snider . |
| 2,465,404 | * | 3/1949 | Sonntag . |
| 2,647,636 | * | 8/1953 | Rafferty ............................ 210/497.3 |
| 4,961,847 | * | 10/1990 | Amr .................................. 210/497.01 |
| 5,132,013 | * | 7/1992 | Thompson ............................ 210/448 |

OTHER PUBLICATIONS

Approval Standard: Strainers for Use With Water Spray Systems; Class No. 5551; Jun. 26, 1963; reissued Aug. 1, 1970; Factory Mutual Research Corporation; p. 3.

Subject 321, Outline of Investigation for Pipeline Strainers; Issue No. 2; Jun., 1991; Copyright 1989, 1991 Underwriters Laboratories Inc.; p. 6.

Pipe Line Strainer Model A; Grinnell Corporation, Exeter, NH; Printed in U.S.A. 9–82 (Pamphlet).

Pipe Line Strainer Model B–1; Grinnell Corporation, Exeter, NH; Printed in U.S.A. 1–93 (Pamphlet).

* cited by examiner

*Primary Examiner*—Joseph W. Drodge
(74) *Attorney, Agent, or Firm*—Fish & Richardson P.C.

(57) ABSTRACT

A pipe line strainer has a strainer body having an inner body wall surface and defining a flow passageway, and further defining a strainer inlet in communication with the flow passageway and a strainer outlet spaced from the strainer inlet along the flow passageway in a direction for fluid flow, and a strainer basket disposed within the flow passageway between the strainer inlet and the strainer outlet. The strainer basket has a strainer basket wall defining a plurality of through apertures of predetermined cross dimension for flow of fluid from the strainer inlet toward the strainer outlet, the strainer basket wall dividing the flow passageway into a first region of flow upstream of the strainer basket wall and a second region of flow downstream of the strainer basket wall. At least one of the first region of flow and the second region of flow has an unequal distribution of flow due to change in incremental flow cross sectional area in the direction for fluid flow, with the larger cross-sectional area coinciding with an area of higher flow.

14 Claims, 8 Drawing Sheets

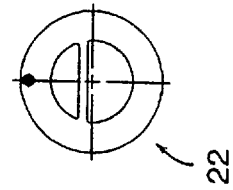
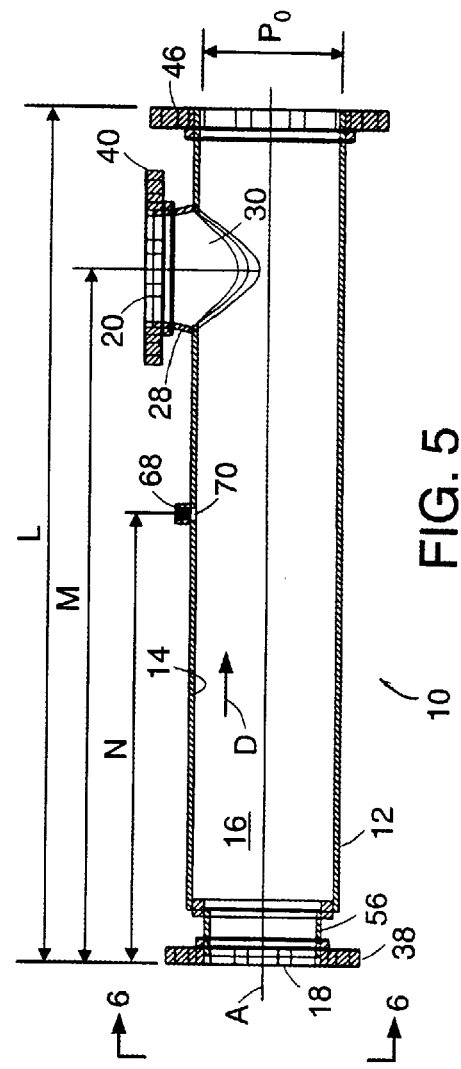
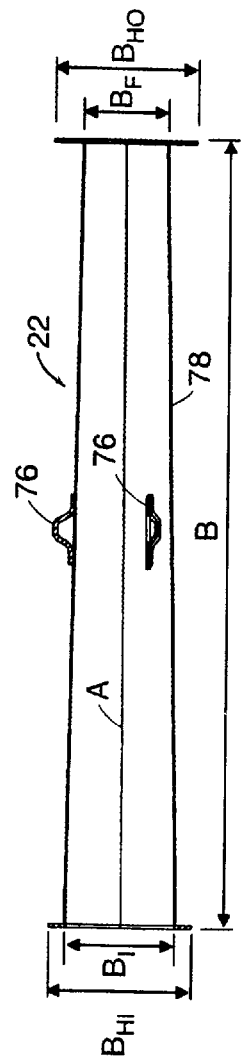
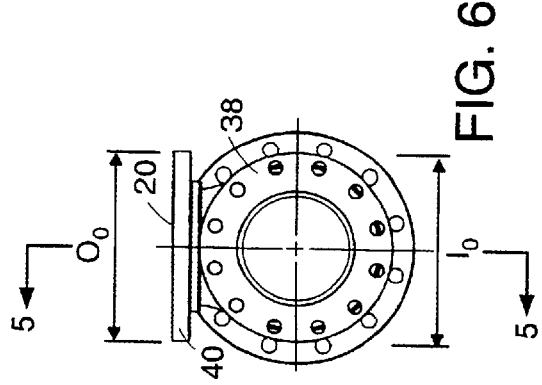
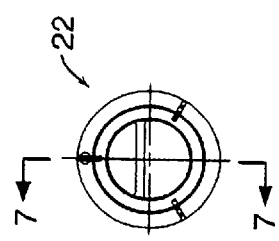

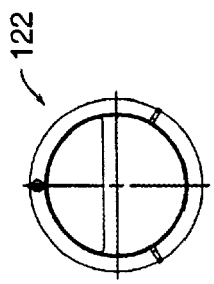
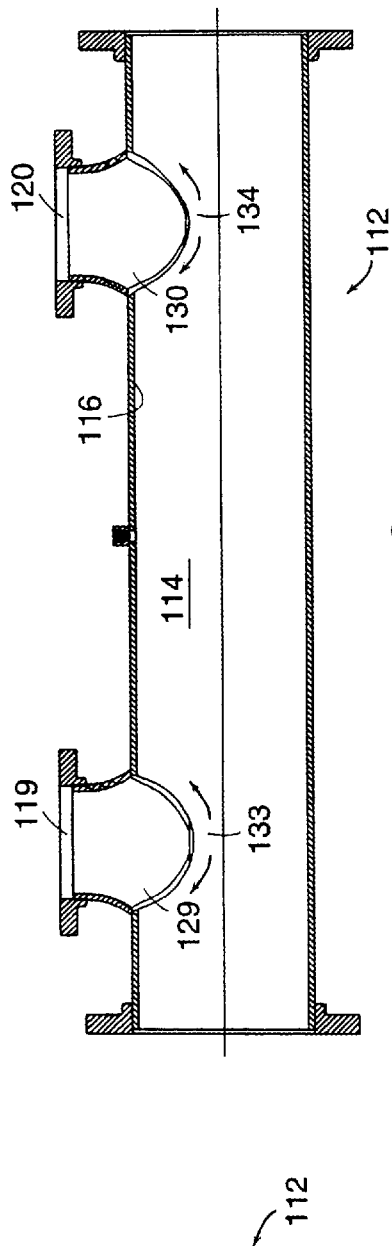
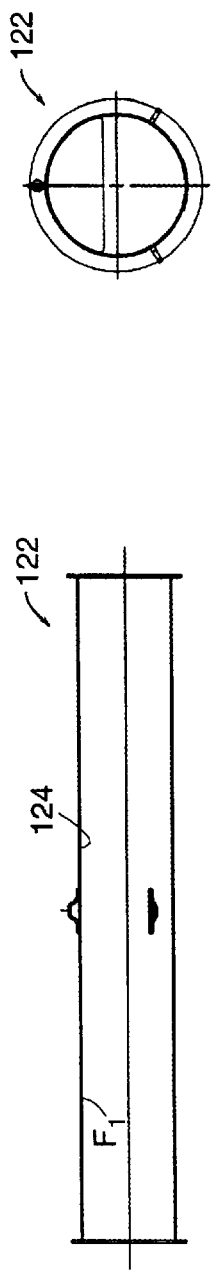
FIG. 17
FIG. 19
FIG. 21
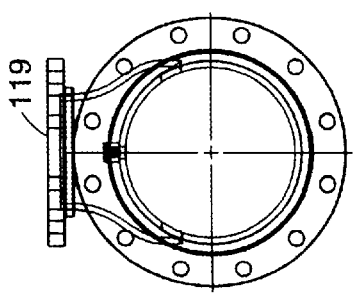
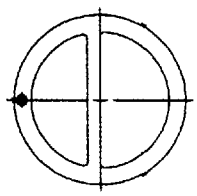
FIG. 18
FIG. 20

STRAINER

TECHNICAL FIELD

This invention relates to pipe line strainers.

BACKGROUND

Pipe line strainers are designed for installation in the water supply connection to automatic sprinkler, water spray deluge, foam-water deluge, or standpipe fire protection systems. The strainers are used in systems where it is necessary or desirable to protect spray nozzles, sprinklers and/or other types of discharge outlets from obstruction by debris that may be present in the water supply. A typical strainer consists of a body that defines a conduit providing water flow from an inlet to an outlet, with a basket screen therebetween to stop debris having dimensions greater than, e.g., about 1/8 inch which may be present in water supply.

SUMMARY

According to the invention, a pipe line strainer comprises a strainer body having an inner body wall surface and defining a flow passageway, and further defining a strainer inlet in communication with the flow passageway and a strainer outlet or outlets spaced from the strainer inlet along the flow passageway in a direction for fluid flow generally from the strainer inlet toward the strainer outlet or outlets. The flow passageway extends generally between the strainer inlet and the strainer outlet or outlets. The pipe line strainer further comprises a strainer basket disposed within the flow passageway between the strainer inlet and the strainer outlet or outlets, the strainer basket comprising a strainer basket wall defining a plurality of through apertures of predetermined cross dimension for flow of fluid from the strainer inlet toward the strainer outlet or outlets. The strainer basket wall divides the flow passageway into a first region of flow upstream of the strainer basket wall and a second region of flow downstream of the strainer basket wall, with fluid transported from the first region for flow to the second region for flow through the plurality of through apertures of the strainer basket. At least one of the first region of flow and the second region of flow has an unequal distribution of flow velocity and/or an unequal distribution of flow volume due to increasing or decreasing incremental flow cross sectional area in the direction for fluid flow.

Preferred embodiments of the invention may include one or more of the following additional features. At least the first region of flow has the unequal distribution of flow, or unequal flow velocity, in part due to decrease in incremental flow cross sectional area in the direction for fluid flow. Preferably, the strainer basket wall has an inclined surface (relative to the inner body wall surface) opposing the strainer outlet, and/or the strainer basket wall is conical in shape with decreasing diameter in the direction for fluid flow or the strainer basket wall has a right conical shape with decreasing diameter in the direction for fluid flow and/or the strainer basket wall is coaxial with the strainer body. The second region of flow has the unequal distribution of flow, in part due to increase in incremental flow cross sectional area in the direction for fluid flow coinciding with at least one of: a direction of increasing volumetric flow within the second region of flow and a direction of increasing flow velocity within the second region of flow. Preferably, the increase in incremental flow cross sectional area coincides with at least the direction of increasing volumetric flow, or the direction of increasing flow velocity, within the second region of flow, the strainer basket wall having an inclined surface (relative to the inner body wall surface) opposing the strainer outlet, and/or the strainer basket wall being conical in shape with decreasing diameter in the direction for fluid flow or the strainer basket wall having right conical shape and/or the strainer basket wall being coaxial with the strainer body. Preferred embodiments of the invention may also include a strainer with an outlet having its axis generally transverse to the axis of the second region for flow. At the junction of the second region and outlet, the increase in incremental flow cross-sectional area coincides with at least the direction of increasing flow velocity, preferably the strainer outlet being defined by a surface of reducing diameter in the direction of fluid flow. The first region of flow defined by the strainer basket wall has an approximately cylindrical shape, and the second region of flow defined by the strainer basket wall with the inner wall surface of the strainer body has an approximately annular outer shape. The strainer outlet has an incremental cross-sectional area in the direction of fluid flow, and a region of the strainer outlet having a relatively higher incremental cross-sectional area is aligned coincident with at least one of: a region about the strainer basket at the junction with the outlet having a flow area relatively less than a coincident flow area of the strainer outlet, and/or a flow region about the strainer basket having a fluid flow velocity higher than a coincident fluid flow velocity of the strainer outlet. In preferred embodiments of this aspect of the invention, the strainer outlet may have a junction region downstream of the inner body wall surface, with the junction region having a reducing profile of a conical reducer. In the area of the intersection of the second region of flow and the outlet, the approximately cylindrically shaped basket wall may also have a conical shape, the second region of flow in the direction of fluid flow having increasing area for fluid flow toward regions of relatively higher volumetric flow.

An objective of the invention is to provide a strainer which is relatively small in size and which has relatively low friction loss, as desirable in fire protection systems. Another objective of the invention is to provide a low cost strainer with low friction losses, i.e. a small pressure drop between the strainer inlet and strainer outlet as water passes through the strainer.

The details of one or more embodiments of the invention are set forth in the accompanying drawings and the description below. Other features, objects, and advantages of the invention will be apparent from the description and drawings, and from the claims.

DESCRIPTION OF DRAWINGS

FIG. 5 is a side section view of a strainer body for the pipe line strainer of FIG. 1, taken at the line 5—5 of FIG. 6;

FIG. 6 is an end view of a strainer body for the pipe line strainer of FIG. 1, taken at the line 6—6 of FIG. 5;

FIGS. 7, 8 and 9 are side section, first end and second end views, respectively, of a strainer basket for the pipe line strainer of FIG. 1, with FIG. 7 taken at the line 7—7 of FIG. 8.

FIGS. 17 and 18 are side section and end views, respectively, of a strainer body for the pipe line strainer of FIG. 14;

FIGS. 19, 20 and 21 are side section, first end and second end views, respectively, of a strainer basket for the pipe line strainer of FIG. 14;

Like reference symbols in the various drawings indicate like elements.

DETAILED DESCRIPTION

Figure 1:
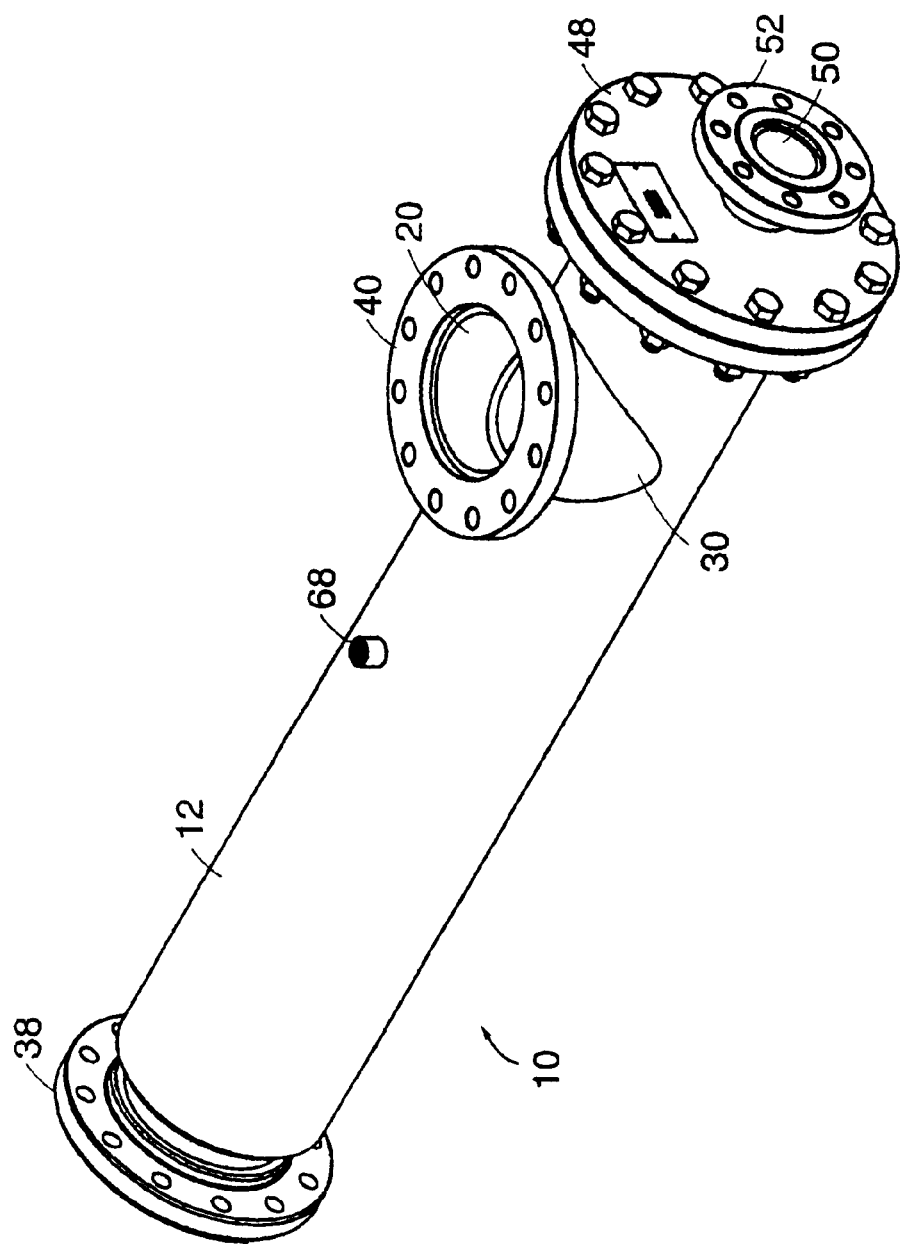
FIG. 1 is a perspective view of one embodiment of a pipe line strainer of the invention.

Referring to FIGS. 1 through 10, a pipe line strainer 10 of the invention has an elongate strainer body 12 with an inner body wall surface 14 defining a flow passageway 16. The strainer body further defines a strainer inlet 18, coaxial with the flow passageway (axis A), and a strainer outlet 20 spaced from the strainer inlet along the flow passageway in a direction for fluid flow (arrow, D). The strainer outlet 20 has an outlet axis, O, generally transverse to a flow passageway axis, A, with the flow passageway extending generally between the strainer inlet 18 and the strainer outlet 20.

A strainer basket 22, disposed within the flow passageway 16 between the strainer inlet and the strainer outlet, has a strainer basket wall 24 defining a plurality of through apertures 26. The apertures have a predetermined diameter, e.g. ⅛-inch, for permitting flow of fluid from the strainer inlet 18 towards the strainer outlet 20, while restricting flow through the strainer basket wall 24 of foreign materials above a predetermined dimension, e.g. ⅛-inch and larger. The strainer basket wall 24 divides the flow passageway 16 into a first region of flow, F1, upstream of the strainer basket wall, and a second region of flow, F2, downstream of the strainer basket wall.

According to the invention, at least one of the first region of flow, F1, or the second region of flow, F2, has an unequal distribution of flow due to change in incremental flow cross sectional area in the direction for fluid flow (arrow, D). For example, referring to FIG. 1 et seq., in the pipe line strainer 10, the strainer basket wall 24 has a conical shape, with decreasing diameter in the direction for fluid flow. As a result, the first region of flow, F1, has an unequal distribution of flow, due to decrease in incremental flow cross sectional area in the direction for fluid flow (arrow, D).

Further according to the invention, the second region of flow, F2, may also or instead have the unequal distribution of flow, due to increase in incremental flow cross sectional area in the direction for fluid flow (arrow, D) coinciding with at least one of: a direction of increasing volumetric flow within the second region of flow, F2, or a direction of increasing flow velocity within the second region of flow, F2.

For example, referring again to FIGS. 1 and 2, the conical shape of the strainer basket wall 24 has decreasing diameter in the direction for fluid flow (arrow, D). As a result, the incremental flow cross sectional area of the annular second region of flow, F2, between the strainer basket wall 24 and the inner wall 14 of the strainer body 12, increases in the direction for fluid flow (arrow, D). This increase in the incremental flow cross sectional area of the second region of flow, F2, coincides with the direction of increasing volumetric flow within the second region of flow, F2, as the fluid passes through the strainer basket wall 24, towards the strainer outlet 20.

Figure 2:
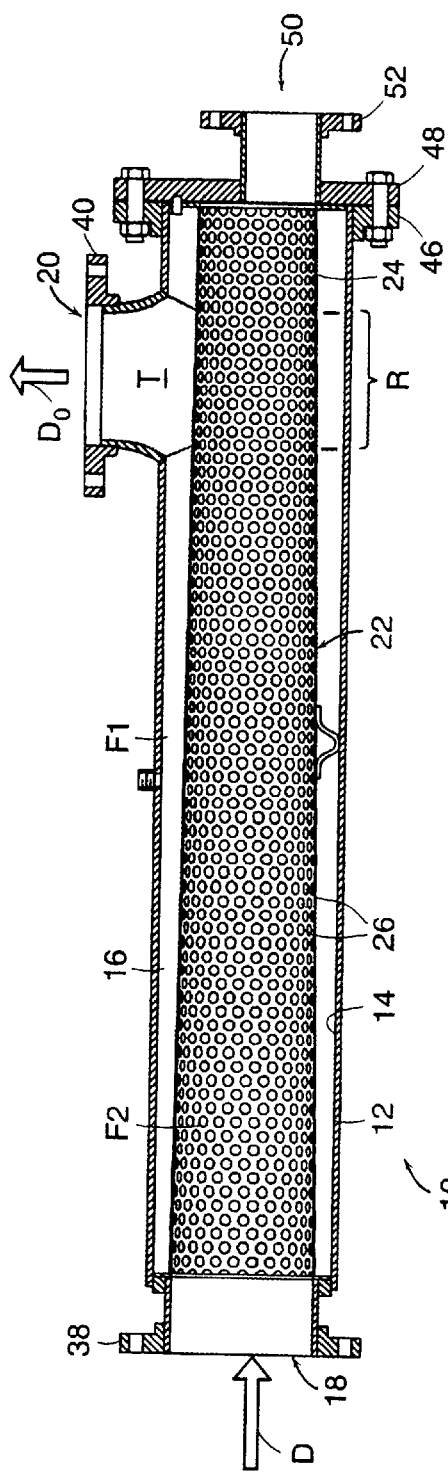
FIG. 2 is a somewhat diagrammatic side section view of the pipe line strainer of FIG.
Figure 4:
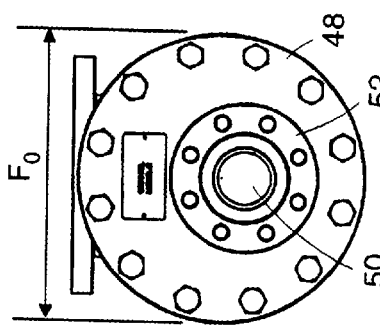
FIG. 4 is an end view of the pipe line strainer of FIG. 1, taken at the line 4—4 of FIG. 3.
Figure 3:
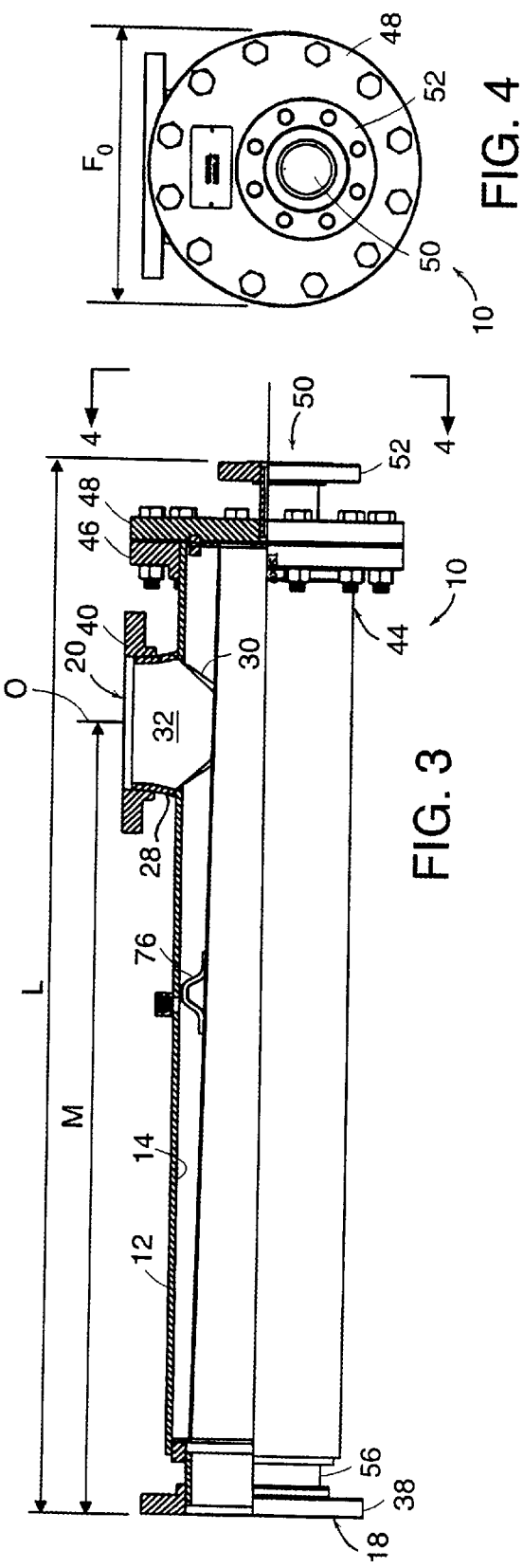
FIG. 3 is a side view, partially in section, of the pipe line strainer of FIG. 1.
Figure 10:
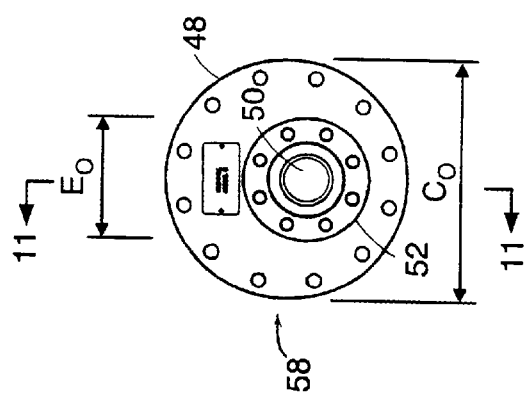
FIGS. 10 and 11 are face and side section views, respectively, of an end flange and flushing connector for the pipe line strainer of FIG. 1, with FIG. 11 taken at the line 11—11 of FIG. 10.
Figure 11:
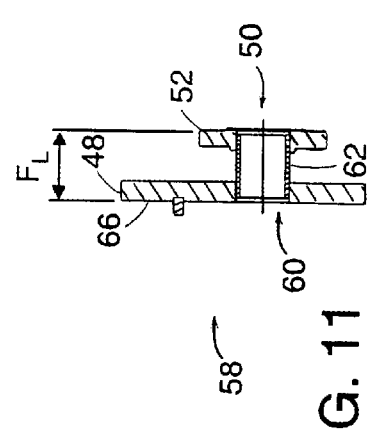
Figure 15:
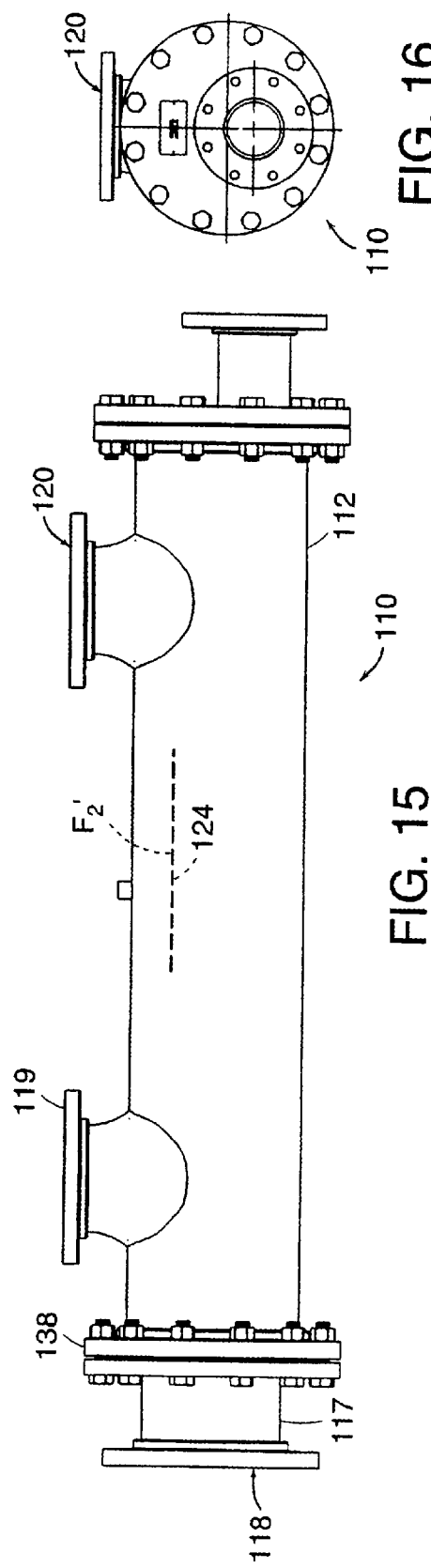
FIG. 15 is a side view, partially in section, of the pipe line strainer of FIG. 14.
Figure 16:
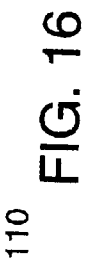
FIG. 16 is an end view of the pipe line strainer of FIG. 14.

Still referring to FIGS. 1 and 2, the strainer outlet 20 has a transition region, T, downstream of the inner wall surface 14 of the body 12, defined by a reducing profile 28 of a conical reducer 30 having a surface 32 of decreasing diameter in the direction of fluid flow (arrow, Do) through the strainer outlet 20, and the incremental flow cross sectional area of the second region of flow, F2, increases in the direction for fluid flow as the fluid moves from the annular flow region about the strainer basket 22 into the opening region 34 of the conical reducer 30. This increase in incremental flow cross sectional area leaving the annular region of flow coincides with the direction of decreasing flow velocity within the second region of flow, as the fluid flowing from the annular region of flow into the strainer outlet decreases in velocity before the flow cross section narrows entering the outlet piping (36, FIG. 12).

The strainer outlet 20 thus has an incremental cross-sectional area in the direction of fluid flow, and a region 34 of the strainer outlet 20 has a relatively higher incremental crosssectional area aligned coincident with the annular region, R, about the strainer basket 22 having a flow area relatively less than the coincident flow area at the opening region 34 of the strainer outlet 20, and the annular flow region, R, about the strainer basket 22 has a fluid flow velocity higher than a coincident fluid flow velocity at the opening region 34 to the strainer outlet 20.

Figure 12:
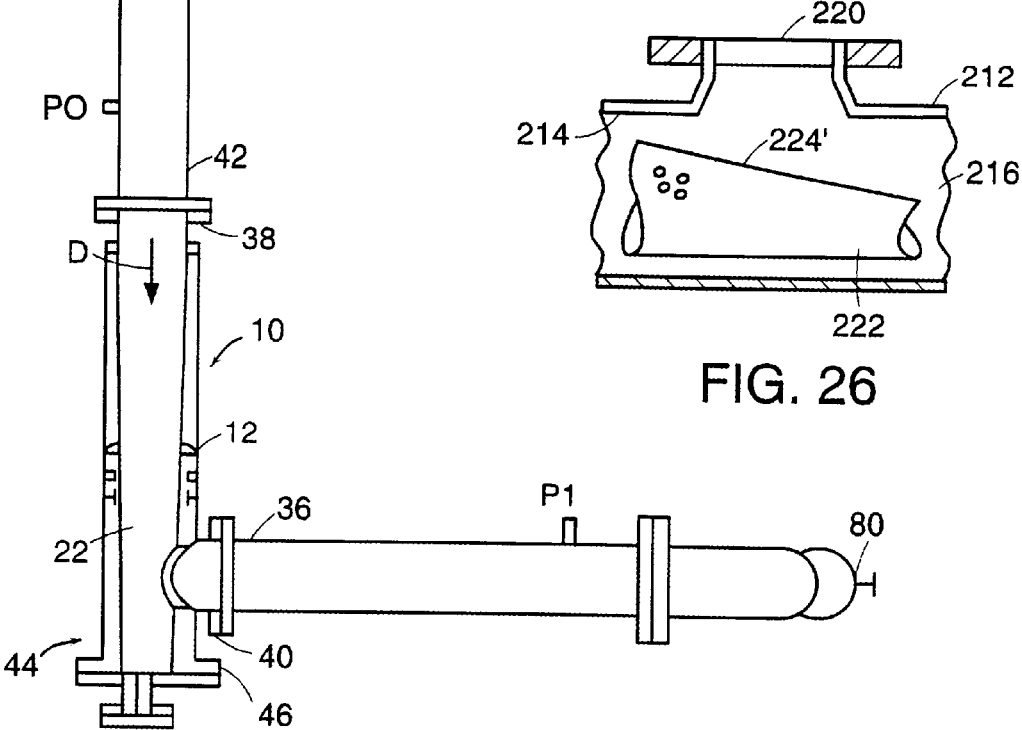
FIG. 12 is a somewhat diagrammatic side view, partially in section, of a pipe line strainer of the invention assembled in a pipe line during testing.
Figure 14:
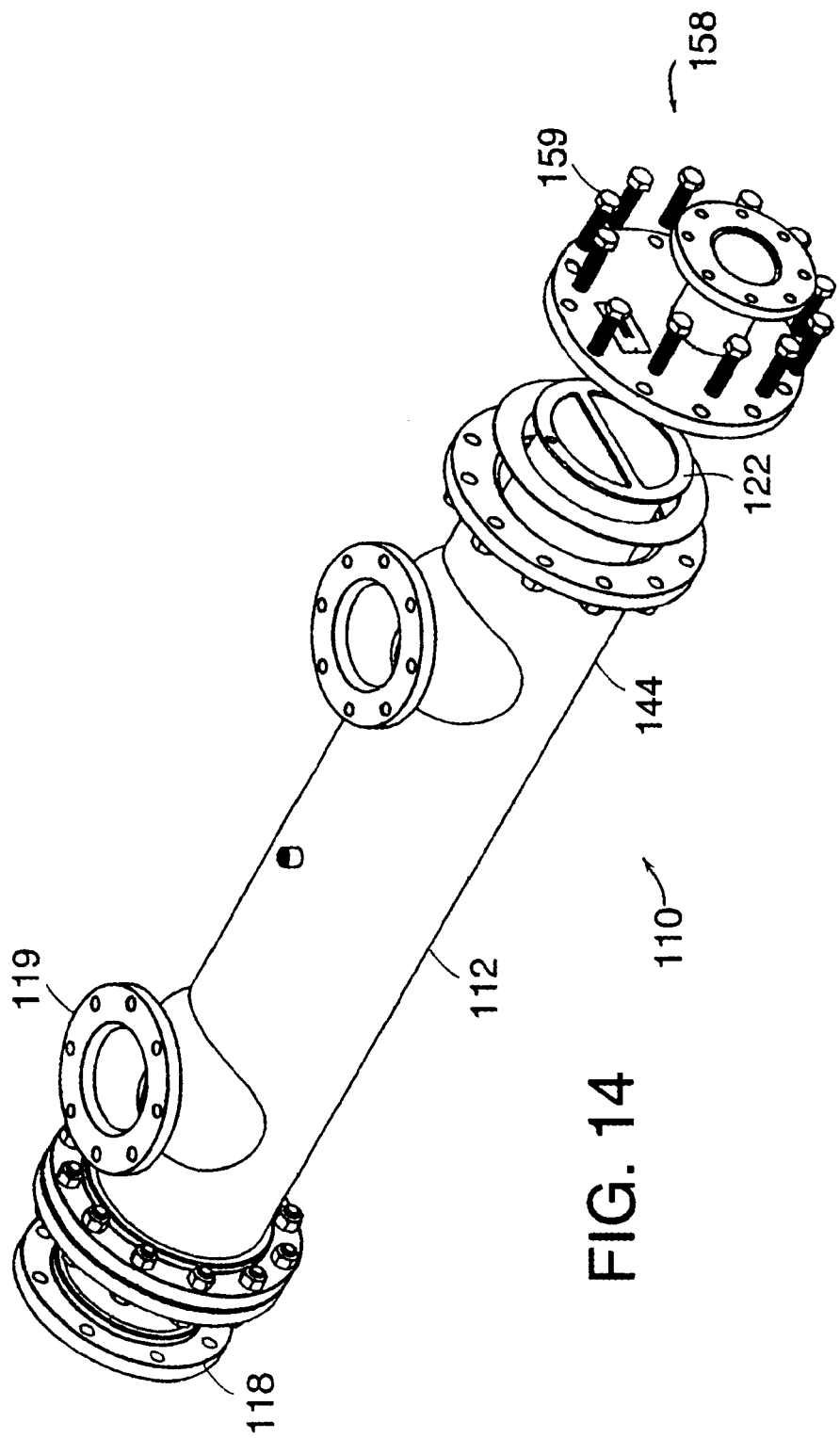
FIG. 14 is an exploded perspective view of another embodiment of a pipe line strainer of the invention.
Figure 23:
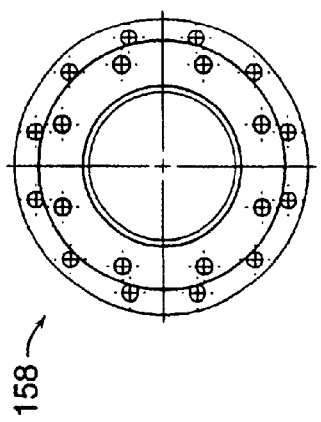
FIGS. 22 and 23 are face and side section views, respectively, of an end flange and flushing connector for the pipe line strainer of FIG. 14.
Figure 22:
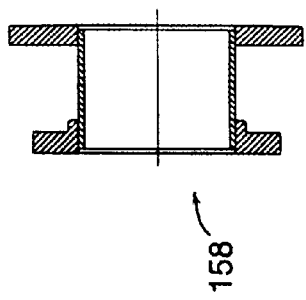

Referring still to FIGS. 1–11, and also now to FIG. 12, in the embodiment shown, the pipe line strainer 10 has bolted flange connectors 38, 40 at the strainer inlet 18 and strainer outlet 20, respectively, for positioning the pipe line strainer 10 between inlet piping 42 and outlet piping 36. The end 44 of the strainer body (opposite to the strainer inlet 18) also has a bolted flange connector 46 to which is mounted a flange 48 with a flush port 50, also with a bolted flange connector 52 for attachment of a flushing pipe line 54 for periodically flushing debris from within the strainer basket 22.

A commercial embodiment of the pipe line strainer 10 of the invention is available from Grinnell Corporation, of Exeter, New Hampshire, under the designation "Model C" pipe line strainer. By way of example only, a commercial 8-inch by 8-inch (8"×8") Model C pipe line strainer from Grinnell Corporation has an overall length, L, e.g. about 69.5 inches.

The strainer body is a Schedule 40 pipe with an outer diameter, Po, e.g. about 10 inches. The axis, O, of the strainer outlet is spaced from a plane, I, of the strainer inlet at a distance, M, e.g. about 54.75 inches. The bolted flange connector 38 at the strainer inlet is, e.g., an 8-inch flange having an outer diameter, Io, e.g. about 13.5 inches. The strainer inlet flange 38 is mounted to the strainer body 12 by pipe section 56, e.g. an 8-inch Schedule 40 pipe. The flange connector 46 mounted at the opposite end 44 of the strainer body is, e.g., an 10-inch flange having an outer diameter, Fo, e.g. about 16 inches.

Bolted to the flange connector 46 is a flushing connector assembly 58, including the bolt connector flange 48 (FIG. 11), e.g. an 10-inch flange having an outer diameter, Co, e.g. about 16 inches, and defining a flushing opening 60, approximately tangential to the passageway axis, A, at which is mounted a 4-inch Schedule 40 pipe 62, terminating in bolted flange connector 52, e.g. an 4-inch flange having an outer diameter, Eo, e.g. about 9 inches. The flushing connector assembly 58 has an overall length, FL, e.g. about 5 inches. A pin 64 extends from the inner surface 66 of the flushing connector flange 48 for securing the position of the strainer basket 22 within the flow passageway 16.

Mounted at the strainer outlet 20 is the conical reducer 30, e.g. an 8-inch by 10-inch reducer, terminating in the bolted flange connector 40, e.g. an 8-inch flange having an outer diameter, Oo, e.g. about 13.5 inches. A ½-inch NPT coupling 68 is mounted at an aperture 70 through the strainer body 12, e.g. for monitoring pressure, at a distance, N, e.g. about 32.25 inches, from the plane, I, of the strainer inlet 18.

The strainer basket 22 is formed of a 14 ga. stainless steel screen with ⅛-inch holes for 40% open area. The basket 22 has an overall length, B, e.g. about 60 inches, with hubs at each end having outer diameters, BHI and BHO, e.g., each about 9.94 inches. The basket wall 24 has a conical shape, with an inlet opening 72 having a diameter, Bi, e.g. about 8 inches, and a flushing opening 74 having a diameter, BF, e.g. about 6.5 inches. Three positioning ears 76 are mounted at 120° about the circumference of the basket 22 at mid-length to extend from the basket outer surface 78 by a distance, E, e.g. about 1.2 inches, into positioning engagement with the inner wall surface 14 of the strainer body 12.

Testing

Tests were conducted on strainers having four different combinations of structural features, as follows:
1) straight basket with straight outlet (typical of strainers currently existing in the market);
2) straight basket with reducing outlet;
3) conical basket with straight outlet: and
4) conical basket with reducing outlet;

to compare the performances of the respective strainers and to determine which combination of structural features has the lowest friction loss. The results of the testing established that the fourth configuration, i.e., the pipe line strainer 10 having a strainer basket 22 of conical shape with reducing outlet 30, performed the best, with approximately 35% less frictional loss as compared to conventional strainers with straight basket and straight exit outlet piping. In the region of maximum flow outside the strainer basket 22, i.e., near the opening region 34 to the outlet 20, the fourth strainer geometry has the largest area between the basket wall 24 and the inner wall surface 14 of the body 12, the largest area between the basket wall 24 and the opening region 34 to the outlet 20, and a smoothed transition geometry into the outlet piping 36. This combination provides the pipe line strainer 10 with reduced head loss to have envelope dimensions comparable to a conventional strainer with higher head loss.

Test Procedure:

A. The pipe line strainers were assembled in turn in the flow lab, as shown in FIG. 12. For each combination of structural features (described above), the flow was started at 500 GPM (gallons per minute) and increased by increments of 250 GPM to a maximum of 2500 GPM, using a downstream control valve 80. The differential pressure was read at each increment.

Figure 13:
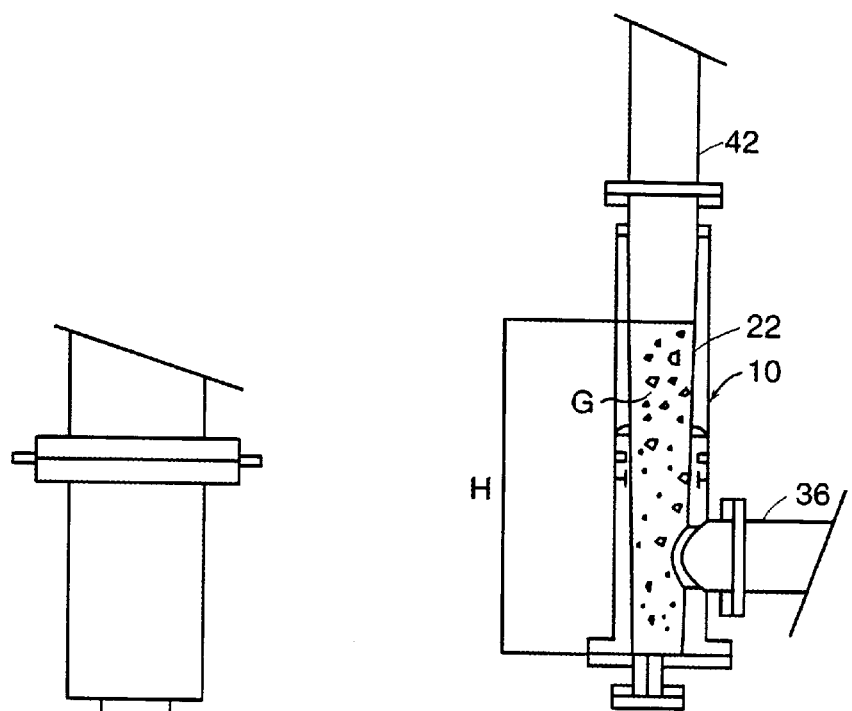
FIG. 13 is a similar view, partially in section, of a pipe line strainer of the invention assembled in a pipe line during testing with the strainer basket partially filled with gravel.

B. Referring now to FIG. 13, the optimal combination of structural features for a pipe line strainer of the invention, as determined by the results obtained in step A, was tested for Factory Mutual approval by filling the basket with 2-½ feet of gravel and repeating step A.

Test Results:

The pipe line strainer with a strainer basket of conical shape and a reducing outlet had approximately 35% less head loss as compared to the prior art pipe line strainer with a straight basket and straight outlet. A strainer with a strainer basket of conical shape and a reducing outlet, as discussed above with respect to FIGS. 1–11, in particular, a strainer embodying the invention with an 8-inch strainer body weighing 260 pounds, yielded results comparable to a prior art Grinnell Model A strainer having a 10-inch body and weighing 404 pounds. Both strainers had less than 3 psi pressure loss at 1300 GPM, as required for approval by Underwriters' Laboratory ("U.L.").

Referring to FIG. 13, when the pipe line strainer 10 with a basket 22 of conical shape was filled with gravel, G, to a height, H, i.e., 2-½ feet from the end 44 opposite the strainer inlet 18, the strainer surpassed Factory Mutual requirements. At 1500 GPM, the pressure loss was less than 10 psi.

Figure 25:
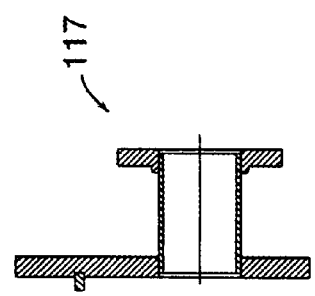
FIGS. 24 and 25 are face and side section views, respectively, of an opposite end flange connector for the pipe line strainer of FIG. 14.
Figure 24:
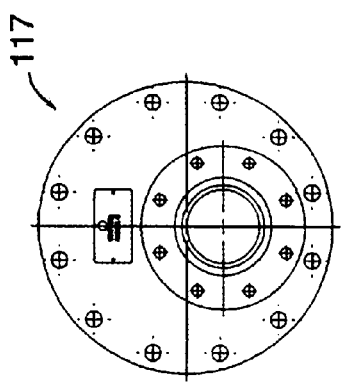

Referring now to FIGS. 14–23, in another embodiment of the invention, a pipe line strainer 110 of the invention has a body 112 defining a flow passageway 114 for flow of fluid between a strainer inlet 118 and a pair of strainer outlets 119, 120. A generally cylindrical strainer basket 122 is disposed in the flow passageway 114, between the strainer inlet 118 and the strainer outlets 119, 120. The strainer inlet 118 is defined by a strainer assembly 117 (FIGS. 24 and 25), which is mounted to a bolted flange connector 138 at the inlet end of the strainer body 112. A flushing connector assembly 158 is attached (with bolts 159) to the body 112 at the end 144 opposite to the inlet 118.

Referring to FIG. 17, each of the strainer outlets 119, 120 has a transition region downstream of the inner wall surface 116 of the body 112, defined by a conical reducer 129, 130, respectively.

In this embodiment, the first region of flow, F1', defined by the strainer basket wall 124, has an approximately cylindrical shape, and the second region of flow, F2', defined by the strainer basket wall 124 with the inner wall surface 116 of the strainer body 112, has an approximately annular outer shape. At least a part of the second region of flow, F2', is shaped to have relatively higher flow area in regions of relatively higher volume flow, i.e., the largest area is found between the basket wall 124 and the opening regions 133, 134 to the outlets 119, 120, respectively, and a smoothed transition geometry into the outlet piping provided by the conical reducers 129, 130, and relatively lower flow area in regions of relatively lower volume flow.

Figure 26:
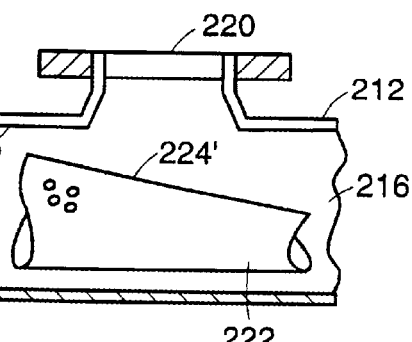
FIG. 26 is a somewhat diagrammatic side section view of yet another embodiment of a pipe line strainer of the invention.

A number of embodiments of the invention have been described. Nevertheless, it will be understood that various modifications may be made without departing from the spirit and scope of the invention. For example, referring to FIG. 26, a pipe line strainer 210 of the invention has a strainer body 212 defining a flow passageway 216 with a strainer outlet 220. A strainer basket 222 disposed within the flow passageway 216 has a right conical shape, with an inclined surface 224'(relative to the inner body wall surface 214) opposing the strainer outlet 220. Accordingly, other embodiments are within the scope of the following claims.

What is claimed is:

1. A pipe line strainer comprising:

an elongate strainer body having an inner body wall surface and defining a cylindrical flow passageway, and further defining a strainer inlet in communication with said cylindrical flow passageway, said inlet being about two inches in diameter smaller than said cylindrical flow passageway, and a strainer outlet perpendicular to said cylindrical flow passageway, said strainer outlet being spaced from said strainer inlet along said cylindrical flow passageway in a direction for fluid flow generally from said strainer inlet toward said strainer outlet, said cylindrical flow passageway extending generally between said strainer inlet and said strainer outlet, and a strainer basket disposed within said cylindrical flow passageway between said strainer inlet and said strainer outlet, said strainer basket comprising a strainer basket wall defining a plurality of through apertures of predetermined cross dimension for flow of fluid from said strainer inlet toward said strainer outlet, said strainer basket wall dividing said cylindrical flow passageway into a first region of flow upstream of said strainer basket wall and a second region of flow downstream of said strainer basket wall, said second region of flow having a transitional region of flow coincident to said perpendicular outlet and bounded between opposed surfaces of said strainer basket and said inner body wall, said transitional region of flow having a flow cross-sectional area equal to or smaller than the cross-sectional area of said strainer inlet and equal to or smaller than the cross-sectional area of said strainer outlet, and said transitional region of flow having at least one of: an unequal distribution of flow velocity or an unequal distribution of total volumetric flow across incremental cross-sections of said transitional region of flow and having a change in incremental flow cross sectional area in said direction for fluid flow, said change in flow cross-sectional area increasing in a direction of increasing flow velocity or increasing in a direction of increasing total volumetric flow in said transitional region of flow.

2. The pipe line strainer of claim 1, wherein at least said second region of flow has said unequal distribution of flow, due to flow of fluid out of said first region into said second region through said apertures of predetermined dimension and due to an increase in incremental flow cross sectional area in said direction for fluid flow coinciding with at least one of: a direction of increasing total volumetric flow within said second region of flow and a direction of increasing flow velocity within said second region of flow.

3. The pipe line strainer of claim 2, wherein said increase in incremental flow cross sectional area in said direction for fluid flow coincides with at least said direction of increasing flow within said second region of flow, said strainer basket wall being conical-shape with decreasing diameter in said direction for fluid flow.

4. The pipe line strainer of claim 1, wherein at least said first region of flow has said unequal distribution of flow, due to flow of fluid out of said first region into said second region through said apertures of predetermined dimension and due to a decrease in incremental flow cross sectional area in said direction for fluid flow coinciding with at least one of: a direction of decreasing total volumetric flow within said first region of flow and a direction of decreasing flow velocity within said first region of flow, said strainer basket wall having a conical shape with decreasing diameter in said direction for fluid flow.

5. The pipe line strainer of claim 2 or 4, wherein said strainer basket wall is coaxial with said strainer body.

6. The pipe line strainer of claim 2 or 4, wherein said strainer basket wall has a right conical shape.

7. The pipeline strainer of claim 4, wherein said decrease in incremental flow cross sectional area in said direction for fluid flow coincides with at least said direction of decreasing flow within said first region of flow.

8. The pipe line strainer of claim 1, wherein said change in incremental flow cross sectional area in said direction for fluid flow is an increase in flow cross sectional area in said direction of increasing flow velocity within said second region of flow, said strainer outlet being defined by a surface of reducing diameter in said direction of fluid flow.

9. The pipe line strainer of claim 8, wherein said first region of flow defined by said strainer basket wall has an approximately cylindrical shape, and said second region of flow defined between said strainer basket wall and said inner wall surface of said strainer body has an approximately annular shape, at least a part of said second region of flow being shaped to have relatively higher flow area in a region of relatively higher volume flow, and a relatively lower flow area in a region of relatively lower volume flow.

10. The pipe line strainer of claim 9, wherein said strainer outlet has an outlet axis generally transverse to a flow passageway axis, said strainer outlet having an incremental cross-sectional area in said direction of fluid flow, and a region of said strainer outlet having a relatively higher incremental cross-sectional area aligned coincident with at least one of: an annular region about said strainer basket having a flow area relatively less than a coincident flow area of said strainer outlet, and an annular flow region about said strainer basket having a fluid flow velocity higher than a fluid flow velocity of said strainer outlet.

11. The pipe line strainer of claim 1 or 10, wherein said strainer outlet has a transition region downstream of said inner body wall surface, with said transition region having a reducing profile of a conical reducer.

12. The pipe line strainer of claim 1 or 9, wherein said strainer basket has a conical shape, the second region of flow in the direction of fluid flow having increasing area for fluid flow toward regions of relatively higher volumetric flow.

13. The pipe line strainer of claim 12, wherein said strainer outlet has a transition region downstream of said inner body wall surface, with said transition region having a reducing profile of a conical reducer.

14. A pipe line strainer body having an inner body wall surface and defining a cylindrical flow passageway, and further defining a strainer inlet in communication with said cylindrical flow passageway and a strainer outlet perpendicular to said cylindrical flow passageway, said strainer outlet being spaced from said strainer inlet along said cylindrical flow passageway in a direction for fluid flow generally from said strainer inlet toward said strainer outlet, said cylindrical flow passageway extending generally between said strainer inlet and said strainer outlet, a ratio of cross-sectional area of said cylindrical flow passageway to said inlet being about 1.5, and a strainer basket disposed within said cylindrical flow passageway between said strainer inlet and said strainer outlet, said strainer basket comprising a strainer basket wall defining a plurality of through apertures of predetermined cross dimension for flow of fluid from said strainer inlet toward said strainer outlet, said strainer basket wall dividing said cylindrical flow passageway into a first region of flow upstream of said strainer basket wall and a second region of flow downstream of said strainer basket wall, said second region of flow having a transitional region of flow coincident to said perpendicular outlet and bounded between opposed surfaces of said strainer basket and said inner body wall, said transitional region of flow having a flow cross-sectional area equal to or smaller than the cross-sectional area of said strainer inlet and equal to or smaller than the cross-sectional area of said strainer outlet, and said transitional region of flow having at least one of: an unequal distribution of flow velocity or an unequal distribution of total volumetric flow across incremental cross-sections of said transitional region of flow and having a change in incremental flow cross sectional area in said direction for fluid flow, said change in flow cross-sectional area increasing in a direction of increasing flow velocity or increasing in a direction of increasing total volumetric flow in said transitional region of flow.

* * * * *